United States Patent
Macaluso (10) Patent No.: US 6,600,346 B1
(45) Date of Patent: Jul. 29, 2003

(54) LOW VOLTAGE DIFFERENTIAL SWING (LVDS) SIGNAL DRIVER CIRCUIT WITH LOW PVT AND LOAD SENSITIVITY

(75) Inventor: Steven Mark Macaluso, Scarborough, ME (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/208,911

(22) Filed: Jul. 30, 2002

(51) Int. Cl.[7] .............................. H03B 1/00; H03K 3/00
(52) U.S. Cl. ...................... 327/108; 327/112; 326/83; 326/86
(58) Field of Search ............................... 327/108, 109, 327/112; 326/63, 30, 82, 83, 86, 68

(56) References Cited

U.S. PATENT DOCUMENTS

| | | | |
|---|---|---|---|
| 5,939,904 A | * | 8/1999 | Fetterman et al. ............. 327/67 |
| 5,977,796 A | * | 11/1999 | Gabara ......................... 326/86 |
| 6,111,431 A | * | 8/2000 | Estrada ........................ 326/83 |
| 6,369,621 B1 | * | 4/2002 | Tinsley et al. ............... 327/108 |
| 6,370,066 B1 | * | 4/2002 | Nagano ................... 365/189.09 |
| 6,380,797 B1 | | 4/2002 | Macaluso et al. ........... 327/513 |
| 6,411,146 B1 | * | 6/2002 | Kuo ............................ 327/198 |
| 2002/0190754 A1 | * | 12/2002 | Brunolli |

* cited by examiner

Primary Examiner—Tuan T. Lam
(74) Attorney, Agent, or Firm—Wildman Harrold Allen & Dixon (57) ABSTRACT

A low voltage differential swing (LVDS) signal driver having substantially constant output differential voltage (Vod) and substantially constant output offset voltage (Vos) irrespective of variations in circuit fabrication processes, power supply voltages and operating temperatures (PVT), as well as circuit load conditions. A driver replica circuit which replicates a portion of the actual LVDS driver circuit conducts a driver replica operating current that is a scaled replica of the LVDS driver operating current. Operating voltages within the LVDS driver and driver replica circuits are monitored and controlled by bias voltages provided by the driver replica circuit. The desired scaling factor for the operating currents is ensured by appropriate scaling of the sizes of the circuit devices within the LVDS driver and driver replica circuits.

21 Claims, 6 Drawing Sheets

LOW VOLTAGE DIFFERENTIAL SWING (LVDS) SIGNAL DRIVER CIRCUIT WITH LOW PVT AND LOAD SENSITIVITY

BACKGROUND OF THE INVENTION

1. Field of the Invention

The present invention relates to high speed digital integrated circuits, and in particular, to low voltage differential swing (LVDS) signal drivers for uses in and with high speed digital integrated circuits.

2. Description of the Related Art

With the tremendous growth of the Internet, data transfers, in terms of both volume and speed, are increasing dramatically in all areas of communications. For example, data streams for digitized video signals, high definition television (HDTV) and color graphics data require increasing amounts of bandwidth. As a result, increasingly higher speed interconnects between integrated circuits (chips), functional boards and systems become increasingly critical. While virtually all such data is digital in form, it is a high speed analog circuit technique that has become increasingly prevalent in meeting such data transfer needs. This circuitry, i.e., LVDS, provides for multigigabit data transfers on copper interconnects and high speed transmission lines, including fiber optic applications. These LVDS circuits have proven speed, low power, noise control and cost advantages important in point-to-point applications for telecommunications, data communications and video displays.

However, while LVDS circuits continue to provide significant advantages in applications requiring high data transfer rates, such circuits are not immune from three major parameters that influence the operation of virtually any circuit or system: circuit fabrication (or manufacture) process variations ("P"); power supply voltage variations ("V"); and operating temperature variations ("T"); often referred to collectively as PVT.

With respect to fabrication process variations, it is well known that notwithstanding the stringent quality control measures typically used to fabricate integrated circuits, fabrication processes nonetheless suffer some variations among the various processing parameters.

With respect to power supply variations, it is well known that notwithstanding the use of various filters or shielding techniques, noise and especially low frequency noise can be present or induced in the power supply line (e.g., switching noise, electromagnetic interference, etc.). Power supply noise can cause jitter on the rising and falling edges of the signal being processed, as well as frequency skew within the output signal.

With respect to operating temperature variations, such variations will virtually never be avoidable, as operating temperatures can vary due to a number of causes, including variations in data transfer rates, ambient temperature, variations in power supply voltage, among others. As operating temperatures vary, so can the amplitude, phase and frequency of some of the signals being processed.

Further, conventional LVDS circuits are sensitive to circuit load conditions. Variations in the load impedance will induce variations in the output differential voltage or output offset voltage or both.

SUMMARY OF THE INVENTION

A low voltage differential swing (LVDS) signal driver having a substantially constant output differential voltage (Vod) and a substantially constant output offset voltage (Vos) irrespective of variations in circuit fabrication processes, power supply voltages and operating temperatures (PVT), as well as circuit load conditions. A driver replica circuit which replicates a portion of the actual LVDS driver circuit conducts a driver replica operating current that is a scaled replica of the LVDS driver operating current. Operating voltages within the LVDS driver and driver replica circuits are monitored and controlled by bias voltages provided by the driver replica circuit. The desired scaling factor for the operating currents is ensured by appropriate scaling of the sizes of the circuit devices within the LVDS driver and driver replica circuits.

In accordance with one embodiment of the presently claimed invention, a low voltage differential swing (LVDS) signal driver includes differential signal driver circuitry and signal replication circuitry. The differential signal driver circuitry receives upper and lower biasing signals and in response thereto conducts a driver operating current, provides a driver monitor signal and receives and converts a differential input signal to a LVDS signal. The signal replication circuitry, coupled to the differential signal driver circuitry, receives upper and lower reference signals and the driver monitor signal and in response thereto provides the upper and lower biasing signals and conducts a replica operating current which is maintained as a predetermined replica of the driver operating current.

In accordance with another embodiment of the presently claimed invention, a low voltage differential swing (LVDS) signal driver includes differential signal driver means and signal replicator means. The differential signal driver means is for receiving upper and lower biasing signals and in response thereto conducting a driver operating current, providing a driver monitor signal and converting a differential input signal to a LVDS signal. The signal replicator means is for receiving upper and lower reference signals and the driver monitor signal and in response thereto providing the upper and lower biasing signals and conducting a replica operating current which is maintained as a predetermined replica of the driver operating current.

In accordance with still another embodiment of the presently claimed invention, a method for generating a low voltage differential swing (LVDS) signal driver includes: receiving upper and lower biasing signals and in response thereto conducting a driver operating current, providing a driver monitor signal and converting a differential input signal to a LVDS signal; receiving upper and lower reference signals and the driver monitor signal and in response thereto providing the upper and lower biasing signals and conducting a replica operating current; and maintaining the replica operating current as a predetermined replica of the driver operating current.

DETAILED DESCRIPTION OF THE INVENTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements will have like or related alpha, numeric or alphanumeric designators.

Figure 1:
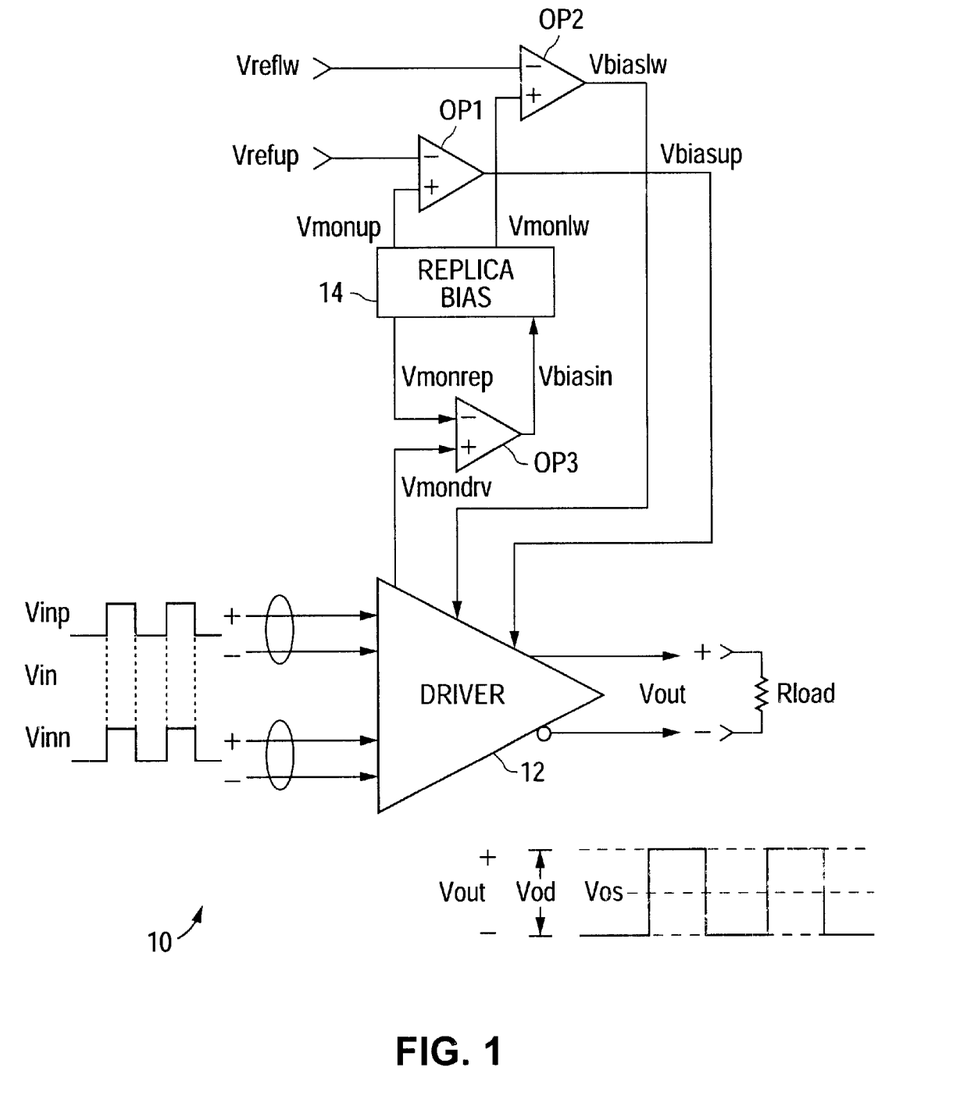
FIG. 1 is a functional block diagram of a LVDS signal driver in accordance with one embodiment of the presently claimed invention.

Referring to FIG. 1, an LVDS signal driver circuit 10 (preferably in integrated circuit form) in accordance with one embodiment of the presently claimed invention includes a differential signal driver circuit 12 and a replica bias circuit 14 which, as discussed in more detail below, provides and replicates a number of bias signals.

In accordance with well known LVDS circuit principles, the driver circuit 12 receives a differential input signal Vin having a primary ("positive") differential signal phase Vinp and an inverse ("negative") differential signal phase Vinn. As is well known, the driver circuit 12 converts this signal Vin to a LVDS output signal Vout having a peak-to-peak differential signal amplitude Vod (e.g., approximately 350 millivolts) and an offset voltage Vos (e.g., 1.2 volts). This output signal Vout drives a load resistance Rload located at the receiver circuitry (not shown) external to this circuitry 10. (As is well known in the art, the differential input signal Vin need not necessarily be a dual differential signal, but can also be a single differential input signal, as discussed in more detail below.)

In accordance with the presently claimed invention, this driver circuitry 12 provides a driver monitor signal Vmondrv and receives two bias signals Vbiasup, Vbiaslw. As discussed in more detail below, this monitor signal Vmondrv is monitored and controlled by way of the incoming bias signals Vbiasup, Vbiaslw with the result being that the driver circuitry 12 has significantly reduced PVT sensitivity.

As discussed in more detail below, the replica bias circuitry 14 generates an upper monitor signal Vmonup and a lower monitor signal Vmonlw, as well as a replica monitor signal Vmonrep. The upper Vmonup and lower Vmonlw signals are compared against corresponding externally generated upper Vrefup and lower Vreflw reference signals, with the resulting difference signals Vbiasup and Vbiaslw, respectively, provided as upper and lower biasing signals to the driver circuitry 12. The replica monitor signal Vmonrep is similarly compared to the driver monitor signal Vmondrv, with the resulting difference signal Vbiasin used to bias the replica bias circuitry 14.

Figure 2:
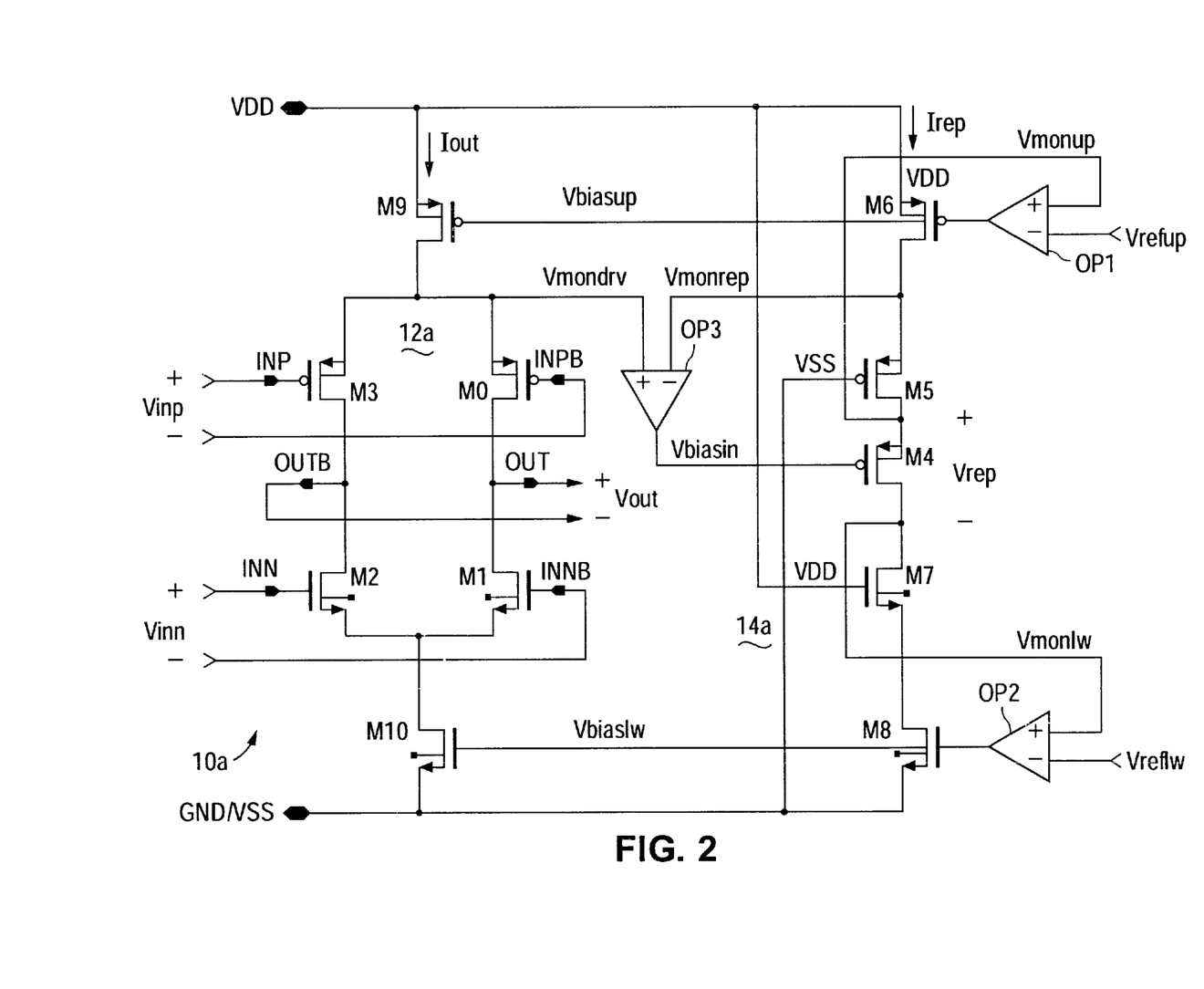
FIG. 2 is an electrical schematic diagram of an example embodiment of the circuit of FIG. 1.

Referring to FIG. 2, one example embodiment 10a of the circuit 10 of FIG. 1 can be implemented as shown. The LVDS driver circuitry 12a includes P-type metal oxide semiconductor field effect transistors (P-MOSFETs) M0, M3 and M9, and N-MOSFETs M1, M2 and M1, all interconnected substantially as shown. Transistors M0, M1, M2 and M3 form the output signal "switchbox" with differential pair transistors M0 and M3 receiving the primary differential phase Vinp and differential pair transistors M1 and M2 receiving the inverse differential phase Vinn of the input signal Vin. (It should be understood that while this output switchbox has been implemented in a complementary arrangement of P-and N-MOSFETs, a similar switchbox can be implemented using all P-MOSFETs or all N-MOSFETs as desired.). The interconnected drain terminals of transistors of M0 and M1 and transistors M2 and M3 provide the differential output signal Vout. In accordance with well known LVDS principles, when transistors M1 and M3 are turned on, transistors M0 and M2 are turned off, while conversely, when transistors M0 and M2 are turned on, transistors M1 and M3 are turned off. Accordingly, the output current Iout is steered through the external load resistor Rload (not shown) to produce the output voltage Vout. (As noted above, the differential input signal Vin need not necessarily be a dual differential signal, but can also be a single differential input signal, in which case for this complementary arrangement of P- and N-MOSFETs, the gate terminals of transistors M3 and M2 would be driven together while the gate terminals of transistors M0 and M1 would be driven together.)

Transistors M9 and M10 serve as a current source and a current sink, respectively, for the output current Iout flowing between the positive power supply terminal VDD and the negative power supply terminal VSS (or ground GND). As discussed in more detail below, transistor M9 is biased by an upper biasing voltage Vbiasup and transistor M10 is biased by a lower biasing voltage Vbiaslw which maintain the output current Iout in such a manner as to establish and maintain the driver monitor voltage Vmondrv at the interconnect between the current source transistor M9 and output switchbox transistors M0 and M3.

The replica bias circuitry 14a includes P-MOSFETs M4, M5 and M6, and N-MOSFETs M7 and M8 interconnected in a telescopic, or totem pole, manner substantially as shown. Transistor M6 serves as a current source controlled by the upper biasing voltage Vbiasup. Similarly, transistor M8 serves as a current sink controlled by the lower biasing voltage Vbiaslw. Transistors M5 and M7, with their respective gate terminals biased at power supply rails VSS and VDD, respectively, are biased in their fully on states and provide isolation between the current source M6 and sink M8 transistors and transistor M4. Transistor M4 is operated to emulate the load resistor Rload by providing within the replica bias circuitry 14a a replica resistance corresponding to the load resistor Rload.

A replica current Irep flows through transistors M6, M5, M4, M7 and M8. As per Ohm's Law, the voltage Vrep across transistor M4 must equal the product of the current Irep through transistor M4 and the resistance RM4 of transistor M4, or Vrep=Irep*RM4.

Similarly, the output current Iout in the driver circuitry 12a flows through the load resistor Rload (not shown). Also as per Ohm's Law, the voltage Vout across the Rload must equal the product of the current Iout through the load Rload and the resistance Rload, or Vout=Iout*Rload.

The gate terminal of transistor M4 is controlled, or modulated, by the intermediate biasing voltage Vbiasin generated by signal comparison circuit OP3. This biasing voltage Vbiasin controls, or modulates, the resistance RM4 of transistor M4. In turn, this controls, or modulates, the replica current Irep through the replica circuitry 14a. Further in turn, this controls, or modulates, the replica monitor voltage Vmonrep which is compared by circuit OP3 against the driver monitor voltage Vmondrv. (It should be understood that, as an alternative, the driver monitor voltage Vmondrv could also be that appearing at the interconnect between the current sink transistor M10 and output switch box transistors M1 and M2. In a corresponding manner, the replica monitor voltage Vmonrep would then be that appearing at the interconnect of transistors M7 and M8. As discussed above, signal comparison amplifier OP3 could monitor these voltages and provide the intermediate biasing voltage Vbiasin in an equally effective manner.)

Based upon this comparison of these input signals Vmondrv, Vmonrep, circuit OP3 will adjust the intermediate biasing voltage Vbiasin as necessary to cause these input signals Vmondrv, Vmonrep to become and remain equal. As a result, the drain-to-source voltages Vds, as well as the gate-to-source voltages Vgs (due to the common gate biasing voltage Vbiasup), of current source transistors M6 and M9 equal. Accordingly, the currents Irep and Iout sourced by these transistors M6 and M9, respectively, are maintained at respective values that are determined by the relative sizes (e.g., channel widths) of these transistors M6, M9. For example, if transistors M6 and M9 were of equal size, then these currents Irep, Iout would be equal, or Irep=Iout. However, if transistor M9 is larger than transistor M6 by a factor of 20 (in accordance with a preferred embodiment of this circuit 10a) then the ratio of the output current Iout to the replica current Irep would be Iout:Irep=20:1.

It should be understood that virtually any scaling factor can be selected, depending upon the desired replica Irep and output Iout currents. Depending upon the desired scaling factor, such scaling factor will be common with respect to the ratios of the sizes of the various transistors as follows: transistors M6 and M9; transistors M5, M0 and M3; transistors M7, M1 and M2; and transistors M8 and M10.

In accordance with this scaling factor, since the transistor stack of the driver circuitry 12a and the transistor stack of the replica biasing circuitry 14a are equal in terms of device counts between the power supply rails VDD, VSS, the respective voltages dropped across the corresponding devices will be equal. For example, the drain-to-source voltages across transistors M6 and M9 will be equal, as will the drain-to-source voltages across transistors M8 and M10, transistors M5, M0 and M3, and transistors M7, M1 and M2. Lastly, the replica voltage Vrep across transistor M4, as noted above, will be equal to the output voltage Vout. This replica voltage Vrep can be changed by proper selection of the upper Vrefup and lower Vreflw reference voltages.

Signal comparison circuitry OP1 receives and compares the upper monitor signal Vmonup and the upper reference voltage Vrefup to provide the upper biasing voltage Vbiasup for transistors M6 and M9. Similarly, signal comparison circuit OP2 receives and compares the lower monitor signal Vmonlw and lower reference voltage Vreflw to provide the lower biasing voltage Vbiaslw to transistors M8 and M10. In accordance with well known voltage comparator circuit principles, if the upper Vmonup or lower Vmonlw monitor signal voltages increase, e.g., due to an increase in the replica current Irep, then the upper Vbiasup and lower Vbiaslw signal voltages, respectively, also increase. Conversely, if these monitor signal voltages Vmonup, Vmonlw decrease, then the corresponding biasing voltages Vbiasup, Vbiaslw also decrease. As a result, the output Iout and replica Irep currents are maintained at the values necessary to, in turn, maintain the output signal voltage Vout at the value established by the controlling of transistor M4.

Figure 3A:
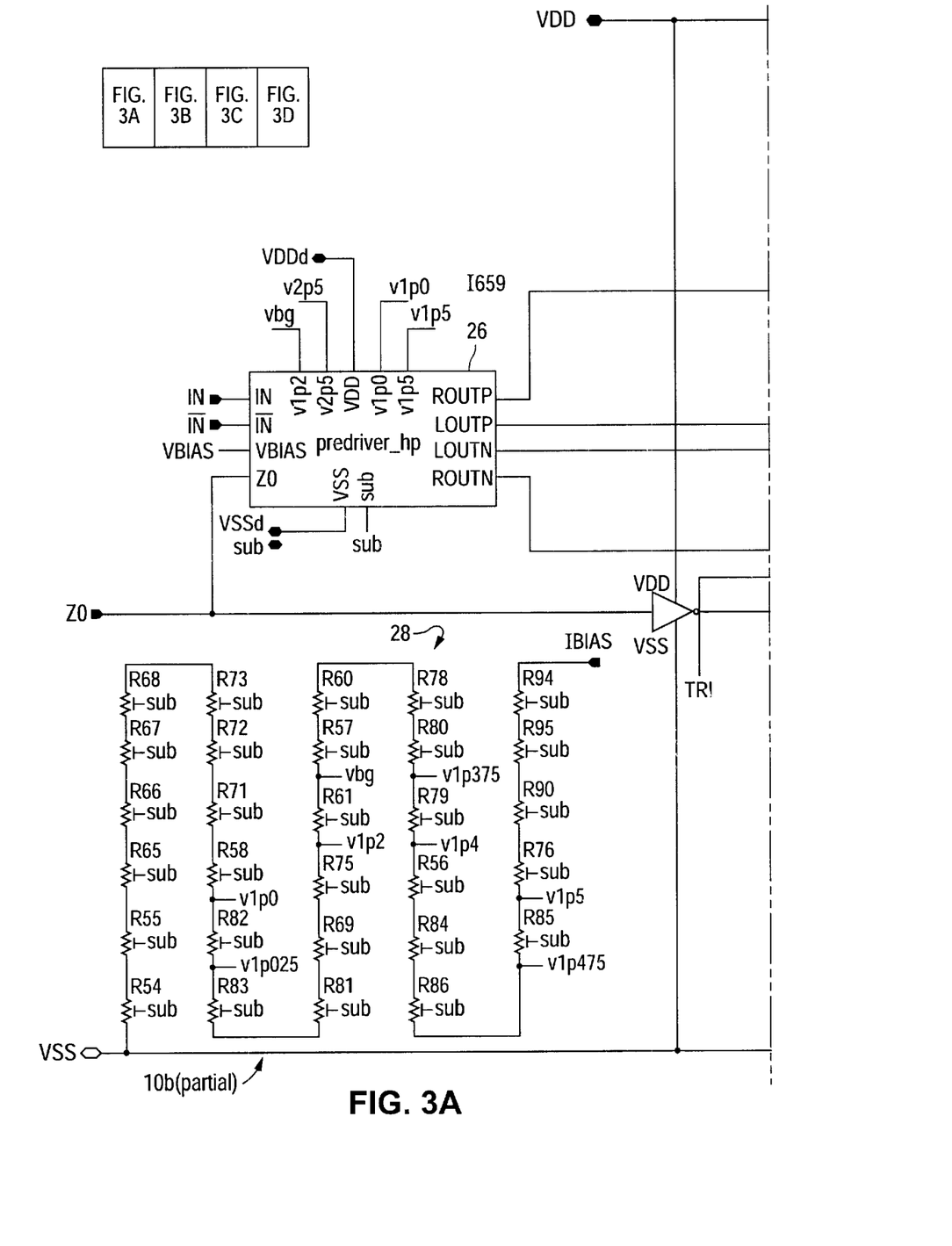
FIGS. 3A–3D together are a more detailed electrical schematic diagram of a specific embodiment of the circuit of FIG. 1 in accordance with the circuit topology of FIG. 2.
Figure 3B:
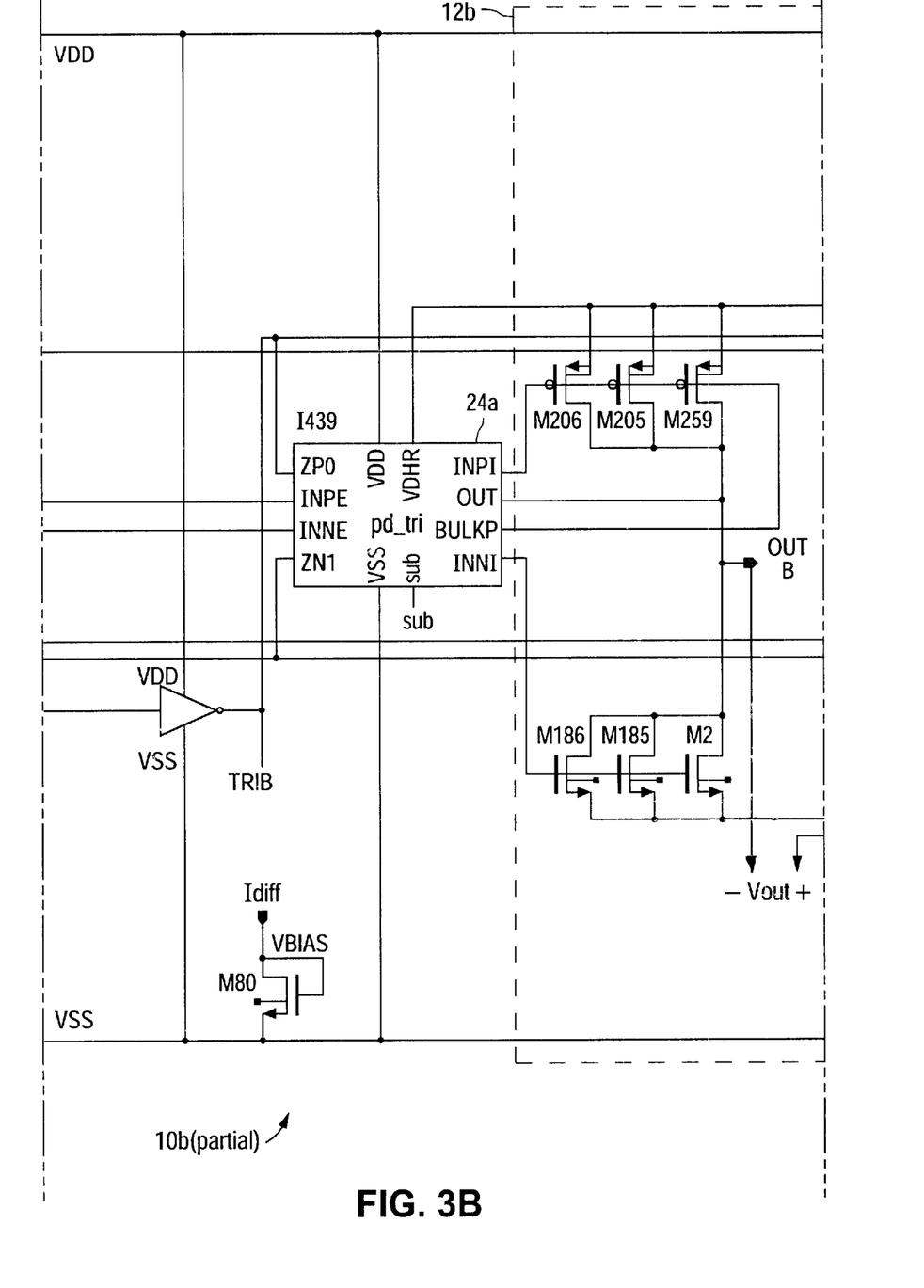
Figure 3C:
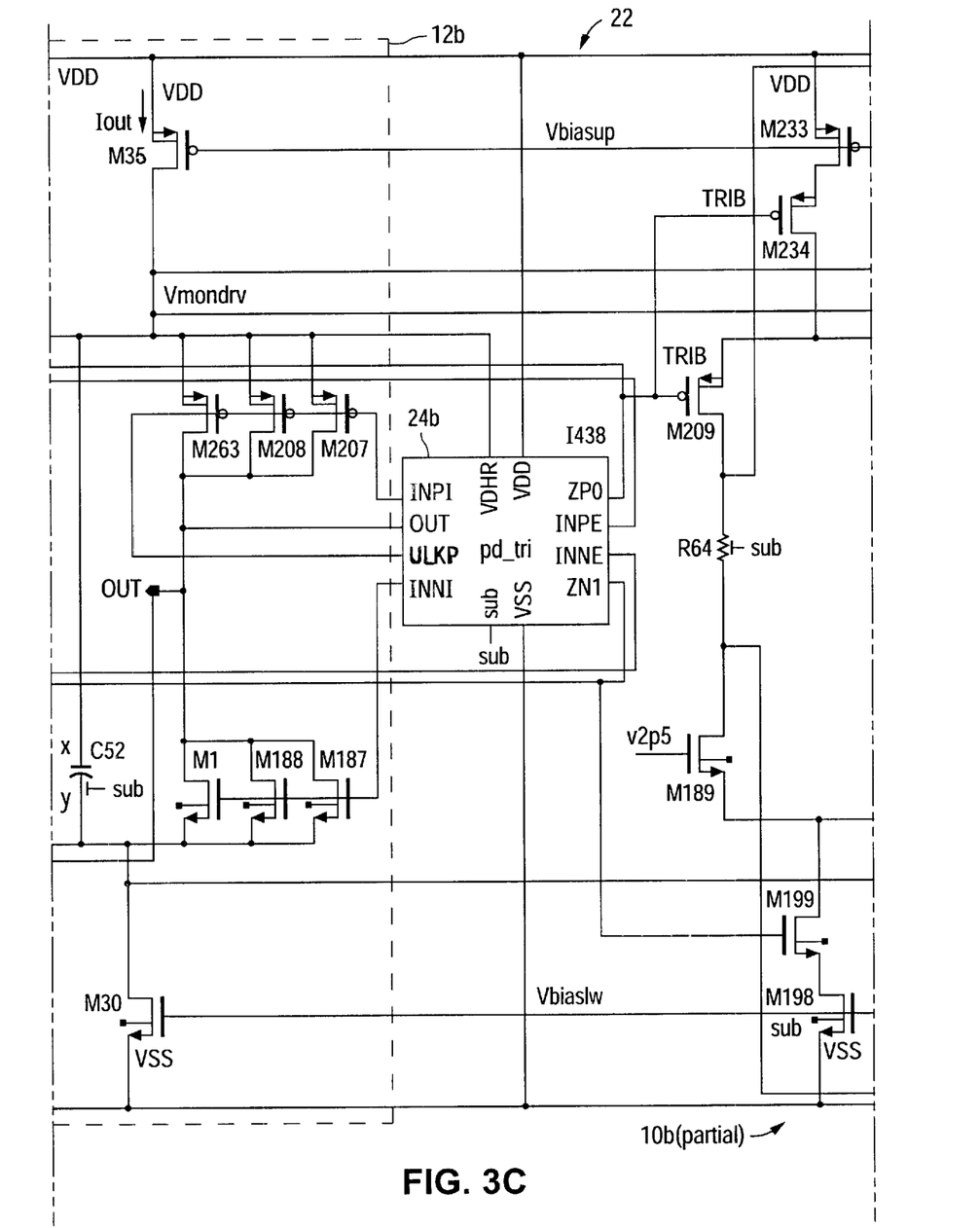
Figure 3D:
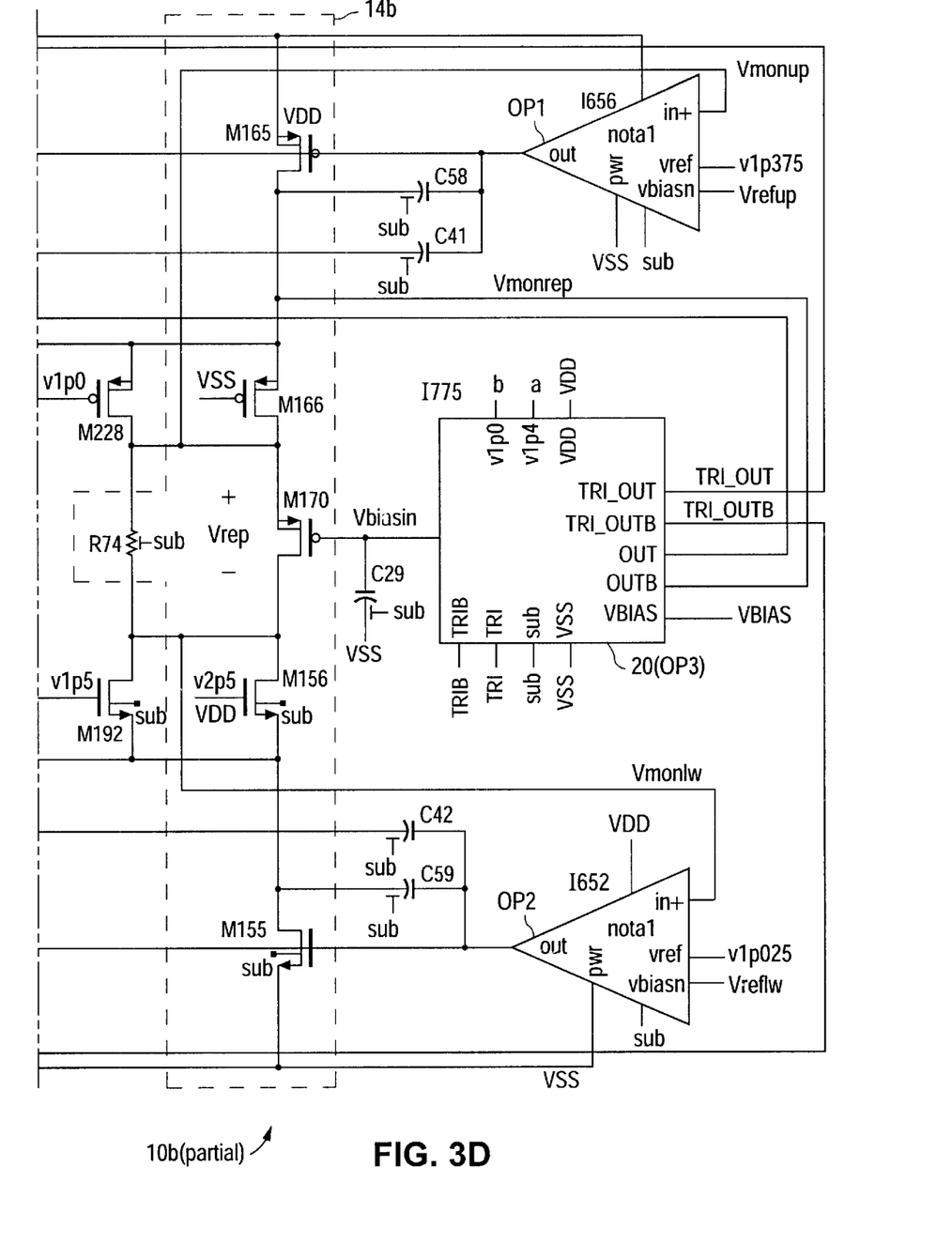

Referring to FIGS. 3A and 3B, a more detailed example embodiment 10b of the circuit 10a of FIG. 2 can be implemented as shown. The LVDS driver circuitry 12b includes P-MOSFETs M206, M205, M259, M263, M208, M207 and M35, and N-MOSFETs, M186, M185, M2, M1, M188, M187 and M30, all interconnected substantially as shown. Transistors M206, M205, M259, M263, M208, M207, M186, M185, M2, M1, M188 and M187 form the output signal switchbox with differential pair transistors M206, M205, M259, M263, M208 and M207 receiving the primary differential phase Vinp and differential pair transistors M186, M185, M2, M1, M188 and M187 receiving the inverse differential phase Vinn of the input signal Vin. The interconnected drain terminals of these transistors provide the differential output signal Vout. Transistors M35 and M30 serve as the current source and current sink, respectively, for the output current Iout.

The replica bias circuitry 14b includes P-MOSFETs M165, M166 and M170, N-MOSFETs M156 and M155, and resistor R74, all interconnected substantially as shown. Resistor R74 is connected across transistor M170 for the purpose of increasing the resolution of the variable resistance formed by the parallel combination of resistor R74 and the drain-to-source, or channel, resistance of transistor M170. Signal comparison circuit OP3, contained within circuit block 20, receives and compares the driver monitor voltage Vmondrv and replica monitor voltage Vmonrep and provides the intermediate biasing voltage Vbiasin to the gate terminal of transistor M170.

Signal comparison circuitry OP1 receives and compares the upper monitor signal Vmonup and the upper reference voltage Vrefup to provide the upper biasing voltage Vbiasup for transistors M165 and M35. Similarly, signal comparison circuit OP2 receives and compares the lower monitor signal Vmonlw and lower reference voltage Vreflw to provide the lower biasing voltage Vbiaslw to transistors M155 and M30. In accordance with well known voltage comparator circuit principles, if the upper Vmonup or lower Vmonlw monitor signal voltages increase, e.g., due to an increase in the replica current Irep, then the upper Vbiasup and lower Vbiaslw signal voltages, respectively, also increase. Conversely, if these monitor signal voltages Vmonup, Vmonlw decrease, then the corresponding biasing voltages Vbiasup, Vbiaslw also decrease. As a result, the output Iout and replica Irep currents are maintained at the values necessary to, in turn, maintain the output signal voltage Vout at the value established by the controlling of transistor M170.

Additional circuitry 22, including P-MOSFETs M233, M234, M209 and M228, N-MOSFETs M189, M192, M199 and M198, resistor R64, and circuit blocks 24a and 24b, which is not part of the presently claimed invention, provides a power down function such that when output signal terminals OUT and OUTB are connected to a signal bus but are not driving such signal bus and, therefore, are placed in a high impedance mode, any other signal voltage appearing on the bus will not cause any of the parasitic diodes within the output P-MOSFETs to turn on due to the presence of such signal bus voltages.

Other circuitry 26 can also be provided as a pre-driver stage to ensure that, for each phase of the input signal Vin, all of the output current passes to the load with none remaining to be dissipated within the switchbox, thereby ensuring maximum efficiency in terms of transfer of output current to the load. (For example in the circuit of FIG. 2, when transistors M1 and M3 are turned on, transistors M0 and M2 are turned off completely, and conversely, when transistors M0 and M2 are turned on, transistors M1 and M3 are turned off completely.) Additionally, a resistor string 28 can be included to provide any necessary reference voltages.

A simulation of the circuitry 10b as implemented in FIGS. 3A and 3B demonstrated an output voltage Vout having variations in its differential output voltage amplitude Vod and offset voltage Vos of 15 millivolts and 17 millivolts, respectively, across PVT and load resistance variations.

Based upon the foregoing discussion, it can be seen that LVDS signal driver circuitry in accordance with the presently claimed invention advantageously minimizes sensitivity to variations in circuit fabrication processes, power supply voltage and operating temperature. For example, by monitoring and maintaining a constant voltage across the output signal switchbox and maintaining equal biasing voltages across corresponding circuit components within the driver and replica bias circuits while also emulating the load, the differential output Vod and offset Vos voltages will be dependent virtually only on the reference voltages Vrefup, Vreflw. In turn, such reference voltages Vrefup, Vreflw can be generated using PVT-insensitive voltage sources such as bandgap voltage sources, which demonstrate high immunity from PVT variations and are well known in the art.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a low voltage differential swing (LVDS) signal driver, comprising:

differential signal driver circuitry that receives upper and lower biasing signals and in response thereto conducts a driver operating current, provides a driver monitor signal and receives and converts a differential input signal to a LVDS signal; and signal replication circuitry, coupled to said differential signal driver circuitry, that receives upper and lower reference signals and said driver monitor signal and in response thereto provides said upper and lower biasing signals and conducts a replica operating current which responsive to said driver monitor signal, is maintained as a predetermined replica of said driver operating current.

2. The apparatus of claim 1, wherein said differential signal driver circuitry comprises:

current source circuitry that receives said upper biasing signal and in response thereto sources said driver operating current;

current sink circuitry that receives said lower biasing signal and in response thereto sinks said driver operating current; and differential amplifier circuitry, coupled between said current source circuitry and said current sink circuitry, that receives said differential input signal and in response thereto selectively conducts said driver operating current to produce said LVDS signal.

3. An apparatus including a low voltage differential swing (LVDS) signal driver, comprising:

differential signal driver circuitry that receives upper and lower biasing signals and in response thereto conducts a driver operating current, provides a driver monitor signal and receives and converts a differential input signal to a LVDS signal; and signal replication circuitry, coupled to said differential signal driver circuitry, that receive upper and lower reference signals and said driver monitor signal and in response thereto provides said upper and lower biasing signals and conducts a replica operating current which is maintained as a predetermined replica of said driver operating current wherein said signal replication circuitry comprises current control circuitry that receives an intermediate biasing signal and said upper and lower reference signals and in response thereto conducts said replica operating current and provides a replica monitor signal; and monitor signal comparison circuitry, coupled to said current control circuitry, that receives and compares said driver and replica monitor signals and in response thereto provides said intermediate biasing signal, wherein said driver and replica monitor signals are maintained at substantially equal values.

4. The apparatus of claim 3, wherein said current control circuitry comprises:

current source circuitry that receives said upper reference signal and in response thereto sources said replica operating current;

current sink circuitry that receives said lower reference signal and in response thereto sinks said replica operating current; and controlled resistance circuitry, coupled between said current source circuitry and said current sink circuitry, that receives said intermediate biasing signal and in response thereto conducts said replica operating current via a selected resistance.

5. The apparatus of claim 3, wherein said current control circuitry comprises:

current source circuitry that receives said upper biasing signal and in response thereto sources said replica operating current and provides an upper monitor signal;

current sink circuitry that receives said lower biasing signal and in response thereto sinks said replica operating current and provides a lower monitor signal;

controlled resistance circuitry, coupled between said current source circuitry and said current sink circuitry, that receives said intermediate biasing signal and in response thereto conducts said replica operating current via a selected resistance; and bias signal control circuitry, coupled to said current source circuitry and said current sink circuitry, that receives and compares said upper and lower monitor signals and said upper and lower reference signals, respectively, and in response thereto provides said upper and lower biasing signals.

6. An apparatus including a low voltage differential swing (LVDS) signal driver, comprising:

differential signal driver circuitry that receives upper and lower biasing signals and in response thereto conducts a driver operating current, provides a driver monitor signal and receives and converts a differential input signal to a LVDS signal; and signal replication circuitry, coupled to said differential signal driver circuitry that receives upper and lower reference signals and said driver monitor signal and in response thereto provides said upper and lower biasing signals and conducts a replica operating current which is maintained as a predetermined replica of said driver operating current, wherein said signal replication circuitry comprises current control circuitry that receives said driver monitor signal and said upper and lower biasing signals and in response thereto conducts said replica operating current and provides upper and lower monitor signals; and bias signal control circuitry, coupled to said current control circuitry, that receive and compares said upper and lower monitor signals and said upper and lower reference signals, respectively, and in response thereto provides said upper and lower biasing signals.

7. The apparatus of claim 6, wherein said current control circuitry comprises:

current source circuitry that receives said upper biasing signal and in response thereto sources said replica operating current and provides said upper monitor signal;

current sink circuitry that receives said lower biasing signal and in response thereto sinks said replica operating current and provides said lower monitor signal; and controlled resistance circuitry, coupled between said current source circuitry and said current sink circuitry, that receives an intermediate biasing signal and in response thereto conducts said replica operating current via a selected resistance.

8. The apparatus of claim 7, wherein:

said current control circuitry further provides a replica monitor signal responsive to said replica operating current conduction;

said current control circuitry further comprises monitor signal comparison circuitry that receives and compares said driver and replica monitor signals and in response thereto provides said intermediate biasing signal; and said driver and replica monitor signals are maintained at substantially equal values.

9. An apparatus including a low voltage differential swing (LVDS) signal driver, comprising:

differential signal driver circuitry that receives upper and lower biasing signals and in response thereto conducts a driver operating current, provides a driver monitor signal and receives and converts a differential input signal to a LVDS signal; and signal replication circuitry, coupled to said differential signal driver circuitry, that receives upper and lower reference signals and said driver monitor signal and in responds thereto provides said upper and lower biasing signals and conducts a replica operating current which is maintained as a predetermined replica of said driver operating current, wherein said signal replication circuitry comprises current control circuitry that receives an intermediate biasing signal and said upper and lower biasing signals and in response thereto conducts said replica operating current and provides a replica monitor signal, an upper monitor signal and a lower monitor signal;

monitor signal comparison circuitry, coupled to said current control circuitry, that receives and compares said driver and replica monitor signals and in response thereto provides said intermediate biasing signal, wherein said driver and replica monitor signals are maintained at substantially equal values; and bias signal control circuitry, coupled to said current control circuitry, that receives and compares said upper and lower monitor signals and said upper and lower reference signals, respectively, and in response thereto provides said upper and lower biasing signals.

10. The apparatus of claim 9, wherein said current control circuitry comprises:

current source circuitry that receives said upper biasing signal and in response thereto sources said replica operating current and provides said upper monitor signal;

current sink circuitry that receives said lower biasing signal and in response thereto sinks said replica operating current and provides said lower monitor signal; and controlled resistance circuitry, coupled between said current source circuitry and said current sink circuitry, that receives said intermediate biasing signal and in response thereto conducts said replica operating current via a selected resistance.

11. An apparatus including a low voltage differential swing (LVDS) signal driver, comprising:

differential signal driver circuitry that receives upper and lower biasing signals and in response thereto conducts a driver operating current, provides a driver monitor signal and receives and converts a differential input signal to a LVDS signal; and signal replication circuitry, coupled to said differential signal driver circuitry, that receives upper and lower reference signals and said driver monitor signal and in response thereto provides said upper and lower biasing signals and conducts a replica operating current which, responsive to said driver monitor signal, is maintained as a predetermined replica of said driver operating current, wherein said differential signal driver circuitry comprises a plurality of driver circuit devices having a plurality of associated driver circuit device sizes;

said signal replication circuitry comprises a plurality of replica circuit devices having a plurality of associated replica circuit device sizes; and respective ones of said plurality of associated replica circuit device sizes are proportional to corresponding ones of said plurality of associated driver circuit device sizes.

12. An apparatus including a low voltage differential swing (LVDS) signal driver, comprising:

differential signal driver means for receiving upper and lower biasing signals and in response thereto conducting a driver operating current, providing a driver monitor signal and converting a differential input signal to a LVDS signal; and signal replicator means for receiving upper and lower reference signals and said driver monitor signal and in response thereto providing said upper and lower biasing signals and conducting a replica operating current which, responsive to said driver monitor signal, is maintained as a predetermined replica of said driver operating current.

13. The apparatus of claim 12, wherein said differential signal driver means comprises:

current source means for receiving said upper biasing signal and in response thereto sourcing said driver operating current;

current sink means for receiving said lower biasing signal and in response thereto sinking said driver operating current; and differential amplifier means for receiving said differential input signal and in response thereto selectively conducting said driver operating current to produce said LVDS signal.

14. An apparatus including a low voltage differential swing (LVDS) signal driver, comprising:

differential signal driver means for receiving upper and lower biasing signals and in response thereto conducting a driver operating current, providing a driver monitor signal and converting a differential input signal to a LVDS signal; and signal replicator means for receiving upper and lower reference signals and said driver monitor signal and in response thereto providing said upper and lower biasing signals and conducting a replica operating current which is maintained as a predetermined replica of said driver operating current, wherein said signal replicator means comprises current controller means for receiving an intermediate biasing signal and said upper and lower reference signals and in response thereto conducting said replica operating current and providing a replica monitor signal; and monitor signal comparator means for comparing said driver and replica monitor signals and in response thereto providing said intermediate biasing signal, wherein said driver and replica monitor signals are maintained at substantially equal values.

15. An apparatus including a low voltage differential swing (LVDS) signal driver, comprising:

differential signal driver means for receiving upper and lower biasing signals and in response thereto conducting a driver operating current, providing a driver monitor signal and converting a differential input signal to a LVDS signal; and signal replicator means for receiving upper and lower reference signals and said driver monitor signal and in response thereto providing said upper and lower biasing signals and conducting a replica operating current which is maintained as a predetermined replica of said driver operating current, wherein said signal replicator means comprises current controller means for receiving said driver monitor signal and said upper and lower biasing signals and in response thereto conducting said replica operating current and providing upper and lower monitor signals; and bias signal controller means for receiving and comparing said upper and lower monitor signals and said upper and lower reference signals, respectively, and in response thereto providing said upper and lower biasing signals.

16. An apparatus including a low voltage differential swing (LVDS) signal driver, comprising:

differential signal driver means for receiving upper and lower biasing signals and in response thereto conducting a driver operating current, providing a driver monitor signal and converting a differential input signal to a LVDS signal; and signal replicator means for receiving upper and lower reference signals and said driver monitor signal and in response thereto providing said upper and lower biasing signals and conducting a replica operating current which is maintained as a predetermined replica of said driver operating current, wherein said signal replicator means comprises current controller means for receiving an intermediate biasing signal and said upper and lower biasing signals and in response thereto conducting said replica operating current and providing a replica monitor signal, an upper monitor signal and a lower monitor signal;

monitor signal comparator means for receiving and comparing said driver and replica monitor signals and in response thereto providing said intermediate biasing signal, wherein said driver and replica monitor signals are maintained at substantially equal values; and bias signal controller means for receiving and comparing said upper and lower monitor signals and said upper and lower reference signals, respectively, and in response thereto providing said upper and lower biasing signals.

17. A method for generating a low voltage differential swing (LVDS) signal driver, comprising:

receiving upper and lower biasing signals and in response thereto conducting a driver operating current, providing a driver monitor signal and converting a differential input signal to a LVDS signal;

receiving upper and lower reference signals and said driver monitor signal and in response thereto providing said upper and lower biasing signals and conducting a replica operating current; and maintaining said replica operating current as a predetermined replica of said driver operating current in response to said driver monitor signal.

18. The method of claim 17, wherein said receiving upper and lower biasing signals and in response thereto conducting a driver operating current, providing a driver monitor signal and converting a differential input signal to a LVDS signal comprises:

receiving said upper biasing signal and in response thereto sourcing said driver operating current;

receiving said lower biasing signal and in response thereto sinking said driver operating current; and receiving said differential input signal and in response thereto selectively conducting said driver operating current to produce said LVDS signal.

19. A method for generating a low voltage differential swing (LVDS) signal driver, comprising:

receiving upper and lower biasing signals and in response thereto conducting a driver operating current, providing a driver monitor signal and converting a differential input signal to a LVDS signal;

receiving upper and lower reference signals and said driver monitor signal and in response thereto providing said upper and lower biasing signals and conducting a replica operating current by receiving an intermediate biasing signal and said upper and lower reference signals and in response thereto conducting said replica operating current and providing a replica monitor signal; and comparing said driver and replica monitor signals and in response thereto providing said intermediate biasing signal, wherein said driver and replica monitor signals are maintained at substantially equal values; and maintaining said replica operating current as a predetermined replica of said driver operating current.

20. A method for generating a low voltage differential swing (LVDS) signal driver, comprising:

receiving upper and lower biasing signals and in response thereto conducting a driver operating current, providing a driver monitor signal and converting a differential input signal to a LVDS signal;

receiving upper and lower reference signals and said driver monitor signal and in response thereto providing said upper and lower biasing signals and conducting a replica operating current by     receiving said driver monitor signal and said upper and lower biasing signals and in response thereto conducting said replica operating current and providing upper and lower monitor signals; and     comparing said upper and lower monitor signals and said upper and lower reference signals respectively, and in response thereto providing said upper and lower biasing signals; and maintaining said replica operating current as a predetermined replica of said driver operating current.

21. A method for generating a low voltage differential swing (LVDS) signal driver, comprising:

receiving upper and lower biasing signals and in response thereto conducting a driver operating current, providing a driver monitor signal and converting a differential input signal to a LVDS signal;

receiving upper and lower reference signals and said driver monitor signal and in response thereto providing said upper and lower biasing signals and conducting a replica operating current by     receiving an intermediate biasing signal and said upper and lower biasing signals and in response thereto conducting said replica operating current and providing a replica monitor signal, an upper monitor signal and a lower monitor signal;

comparing said driver and replica monitor signals and in response thereto providing said intermediate biasing signal, wherein said driver and replica monitor signals are maintained at substantially equal values; and     comparing said upper and lower monitor signals and said upper and lower reference signals, respectively, and in response thereto providing said upper and lower biasing signals; and maintaining said replica operating current as a predetermined replica of said driver operating current.

\* \* \* \* \*